UNITED STATES PATENT OFFICE.

ADOLF GLAS, OF BERLIN, GERMANY

MANUFACTURE OF MILK-POWDER.

No. 843,938.  Specification of Letters Patent.  Patented Feb. 12, 1907.

Application filed June 20, 1904. Serial No. 213,382.

*To all whom it may concern:*

Be it known that I, ADOLF GLAS, a subject of the King of Prussia, and resident of Berlin, Germany, have invented certain new and useful Improvements in the Manufacture of Milk-Powder, of which the following is a specification.

This invention relates to improvements in the manufacture of milk-powder, and consists in an improved method of production, whereby is obtained a milk-powder which on being dissolved in hot water will show all the characteristics of fresh milk, with the same homogeneity of the constituent parts, including the butter-fat, as is found in ordinary milk, and which in its dry state will not turn rancid, but will keep sweet for a considerable length of time, even if exposed to the influence of humidity or air. To this end prior to the drying operation I subject the milk or the cream contained in milk to mechanical treatment serving to disintegrate the fat-globules, so that the milk or the cream when evaporated will contain the fat in the form of minute particles each enveloped in the other solid constituents, and so protected from the air.

The disintegration of the fat particles may be effected by one of the so-called "homogenizing" or "fixing" machines, (for instance, the machine described in the specification of Letters Patent No. 756,953, of Gaulin,) in which the liquid milk is driven through very narrow passages and flows onto a spring-pressed cone, so that the fat-globules are broken up, or in which the milk is squeezed between plates pressed into close proximity with one another or the like. Such homogenizing-machines are well known, and as the invention in no wise relates to the construction of such a machine no further description of the same is required. Milk thus homogenized contains the fat in a state of very fine division, the diameter of the particles being reduced to about 0.0008 centimeters. I now dry this homogenized milk, and so obtain milk-powder showing the above-mentioned characteristics.

If ordinary milk is dried by any known method to form powder and if such powder be afterward dissolved or mixed with hot water, the resultant liquid differs, even if the powder be completely dissolved, from natural milk in this respect, that a considerable percentage of the fat instantly rises to the surface and forms a molten layer of yellowish color—that is to say, the nature of the fat which is contained in ordinary milk in the shape of globules of varying size has been altered by the drying process, partly under the influence of heat, causing a large proportion, which sometimes amounts to ninety per cent., of the fat-globules to coalesce, and partly to the fact that the coating of the globules has been destroyed. This alteration of the physical properties of the fat is the cause of the inferior keeping quality of milk-powder made from ordinary milk and of the separation of the fat from the other constituents of the milk which remain in suspension. This trouble is experienced with every known drying process, whether the drying be effected at high or low temperatures, in the open or in vacuum, on trays or on heated cylinders, or by spraying the liquid into a current of hot air. Whichever of these operations be utilized, however, for the process of drying, the preliminary operation of breaking up the fat-globules prevents in all cases the separation of fat in the shape of a molten layer when the powder is again dissolved. This result is unexpected, in so far as it might have been thought that the complete breaking up of the coating surrounding the fat-globules would have made it much easier for the fat particles to coalesce.

Instead of homogenizing the whole milk and then drying the same I sometimes prefer to first separate the milk into skim-milk and cream by means of an ordinary centrifugal separator or the like, then homogenize the portion containing the cream, and thereafter dry the skim-milk and the cream either together or separately.

The utility of the invention will be evident from consideration of the circumstance that from the demand for milk-powder is due to the difficulty or impossibility of keeping liquid milk in good condition for any length of time and that a powder produced by my process can be transported and stored wherever it is wanted, notwithstanding the existence of those climatic conditions which render the use of milk-powder desirable or necessary and negative the possibility of using non-durable powder.

It is to be observed that the process can be carried out by apparatus presently in use, although the steps of homogenizing and drying milk have nothing in common with each other and are in no sense correlated so as to render the invention obvious to one skilled in the art.

The improved powder resulting from the process is chemically the same as any other pure powder obtained from milk; but its physical properties are widely different.

Reconstituted milk behaves differently from natural milk, especially as regards the action of the fat particles, and it could not have been foreseen merely by observation of the behavior of ordinary homogenized milk that such results would be realized in a milk-powder or in a liquid reconstituted from the same.

It is to be understood that by the operation of homogenizing is meant minutely subdividing the fat-globules by an operation involving a high pressure. In the case of a machine such as described in Patent No. 756,953 this pressure varies from two hundred to three hundred atmospheres.

Having now described my invention, what I claim, and desire to secure by Letters Patent of the United States, is—

1. The improved method of manufacturing milk-powder, consisting in minutely subdividing the fat particles of the milk by homogenizing the same, and then drying the homogenized liquid and converting the product into a dry powder in which the fat particles are completely enveloped by the other solid constituents of the milk, substantially as set forth.

2. A dry homogenized milk-powder containing substantially the same proportion of butter-fat as is contained by whole or unskimmed milk and in which milk-powder the fat particles are in a state of fine subdivision and are completely enveloped by the other solid constituents of the milk so as to be protected from the air, substantially as set forth.

In testimony whereof I have signed my name to this specification in the presence of two subscribing witnesses.

ADOLF GLAS.

Witnesses:
 HENRY HASPER,
 WOLDEMAR HAUPT.